Patented Feb. 16, 1943

2,311,510

UNITED STATES PATENT OFFICE 2,311,510

ROSIN TREATMENT METHOD

László Auer, South Orange, N. J.

No Drawing. Application October 12, 1942,
Serial No. 461,791

8 Claims. (Cl. 260—106)

GENERAL FIELD OF INVENTION AND STATEMENT OF OBJECTS

This invention relates to treatment of rosin, and especially to treatment with certain treating agents promoting modification of the properties of rosin, such as softening or decarboxylation of the rosin. The present application is a continuation-in-part of my copending application Serial No. 386,371, filed April 1, 1941.

As is known, gum or wood rosins contain mixtures of rosin acids, known today as abietic acid, pyro-abietic acid and d-pimaric acid amongst others. Such rosins commonly have an acid value of from about 145 to 185, usually from about 160 to about 168, and in their natural state they are ordinarily hard, brittle materials, of melting point from about 70° C. to about 85° C.

Rosin is a valuable raw material for a number of commercial purposes, such as in paper sizing, soap manufacture, and especially in the coatings and plastics industries. There are, in fact, a number of examples in the art of use of various rosin derivatives for purposes such as those mentioned. Some of the most important and common examples occur in the coatings industry, i. e., use of rosin derivatives in paints, varnishes and the like.

In its natural state, however, rosin is not well suited to many commercial purposes for which it is potentially a valuable raw material.

The primary object of the present invention is to modify various physical properties of rosin, whereby to produce modified rosin products which are better adapted to many uses for which rosin or rosin derivatives are now employed. In addition, the modifications brought about in accordance with the present invention make it possible and advantageous to use the modified rosin products for many purposes for which rosin in its natural state and also various derivatives thereof are not well suited.

To illustrate, reference is made to coating compositions, such as varnishes. In its natural state, rosin is a brittle material and therefore yields a brittle film when employed alone as varnish solids. Thus, rosin in its natural state does not have film forming characteristics such that it may satisfactorily be employed alone as vehicle solids in a coating composition. According to this invention modifications are brought about in the rosin so as to secure a rosin product having drying or film forming characteristics which are well suited to the coating composition industry, thereby even making possible employment of the modified rosin products alone as vehicle solids in varnishes and the like. Usually, however, at least some drying or semi-drying oil is advantageously used with the modified products, particularly where flexibility of the coatings is desired.

Because of the improved properties of the modified rosin products, such products may be employed as a replacement ingredient, in substantial proportions, for linseed or other drying or semi-drying oils in paints and other coating and plastic compositions.

For certain special purposes in the soap and paper sizing industries, the modified rosin products of this invention may also be of advantage, notwithstanding the fact that the modified products have a reduced acid value.

One of the most important modifications brought about by the process of the invention is the softening or liquefying of the rosin, i. e., at least some reduction of brittleness or in melting point, or both. In addition, the process of the invention is notable in its effect on the acid value, the invention providing for appreciable reduction in acid value, as will further appear. In referring to changes of this type and in making comparisons of the modified products with products not treated with modifying agents, it is to be understood that the statements regarding changes and comparisons are always made on the basis of a relation between the product treated with a modifying agent and a product treated in exactly the same manner (heating, etc.) but without a modifying agent. The latter is often herein referred to as a "blank" or "control" experiment.

According to the invention, by appropriate control of treatment conditions, and by appropriate selection of materials, the degree of softening or liquefaction and also of acid value may be regulated to meet various different requirements. For instance, according to the invention, it is possible to very extensively soften the rosin, or to very extensively lower the acid value, or both.

Although the invention is not limited thereto, it is of especial importance and advantage in accordance with the invention to subject the rosin to treatment for a time and under conditions such as to change the physical character of the rosin from its natural hard and brittle condition to a consistency approximating the so-called "cold flow," i. e., a consistency according to which the material will gradually flow at normal room temperatures, so that if a blob of the modified rosin is placed on a flat surface, it will more or less gradually flatten out, often at a rate which is not observable with the eye. For many purposes a liquefaction at least to this degree is desirable.

For certain purposes it is advantageous that the rosin be liquefied even to the extent of becoming a mobile liquid, similar, for instance, to the consistency of certain oils, such as bodied linseed oil.

My preferred range of liquefaction extends from about the consistency of a viscous oil to about the cold flow consistency above mentioned, although it is to be understood that a greater or a lesser degree of liquefaction is also contemplated.

THE MODIFICATION PROCESS

The process of the invention involves heating the rosin in the presence of a modifying agent of the type mentioned hereinafter, the duration of heating, temperature and other treatment conditions, as more fully explained herebelow, being controlled in accordance with the extent and type of modification desired.

In general, modifying agents employed in accordance with this invention, and also in accordance with certain of my copending applications, identified hereinafter, are polar compounds. The present application is particularly directed to the use of certain metal salts as modifying agents.

More specifically, the present invention has reference to the employment of acetates, in both anhydrous and hydrated forms. Various metal acetates and classes thereof may be employed, for instance lead and aluminum acetates.

The foregoing metals are only illustrative and it may be mentioned that appropriate acetates may also be formed with other metals, such as the alkali metals, the alkaline earth metals, magnesium and zinc. Ammonium is considered herein as belonging to the group of alkali metals, since it behaves similarly.

By selection of the modifying agent employed, and by appropriate variations in treatment procedure, temperature, time, etc., I am enabled to produce modified rosin products having quite a wide range of properties. In fact, according to the invention, it is possible to secure a modified product in which either the acid value or the melting point is lowered or in which both of these properties are simultaneously lowered to an appreciable degree. Although the modifying agents disclosed and claimed herein bring about some degree of softening or liquefaction of the rosin, the degree of softening is not as great as may be secured with certain other modifying agents disclosed in copending applications mentioned hereinafter. Products of quite a wide range of acid value are obtainable, however, by the use of the modifying agents herein claimed.

In carrying out the process, the rosin is heated between about 250° C. and about 350° C., depending upon the agent selected and the degree and type of modification desired. Some agents should be heated above about 270° C., in order to secure appreciable modification of the properties of the rosin.

Anywhere from a trace, for instance, .01% or .5% up to about 30% of the metal salt may be employed, although I have found a particularly advantageous range to be from about 2% to about 10%.

Thorough dispersion of the modifying agent in the rosin is of importance and appropriate control of temperature and time both contribute to bringing about such thorough dispersion. Agitation may also be employed as an aid to secure thorough dispersion of the modifying agent. Usually not more than a few hours treatment on temperature will be found sufficient, for instance, from about one hour to about five hours, although in some cases, the reaction proceeds very rapidly, requiring not more than about one half hour.

Another important consideration is that the reaction is preferably carried out in the absence of air, or out of contact with any substantial quantity of air. For this purpose the reaction may be carried out in a closed vessel, though not usually under a positive pressure, so that the gases or fumes of the reaction released from the modifying agent serve to exclude the air.

Vacuum is also effective for the purpose of excluding air and, in addition, reduction in contact of air may be brought about by blanketing the surface of the reaction mixture with some inert gas, such as $SO_2$, $CO_2$, or nitrogen. Where vacuum is used, a pressure, for instance, of about 100 mms. Hg to about 450 mms. Hg will be found effective, although higher or lower pressure may also be used. Whatever means or procedure is employed, it is of advantage to so conduct the process as to reduce oxygen concentration in the reaction vessel and prevent entrance of fresh air or oxygen to the reaction mixture.

Some more or less general considerations regarding the process should be noted, as follows:

Although the complete mechanism of modification may not be fully understood, it may be mentioned that rosin is an organic isocolloid, i. e., a colloidal system in which the dispersed phase and the dispersion medium are both of the same chemical composition, though present in different physical states.

By modification I believe that the relationship or relative proportions of the dispersed phase and dispersion medium may be altered. Moreover, the modification process apparently also involves decarboxylation, the extent of which is usually incomplete. Still further, formation of a soap may occur, by reaction of the rosin with the metal of the compound employed as modifying agent. This soap formation may be responsible, in some instances, for at least a part of the reduction in acid value; and in some cases, may further have the effect of holding the melting point relatively high.

In fact, some of the foregoing effects or reactions (particularly with respect to the physical consistency of the modified product) may work in one direction and others in the opposite direction. Thus, when soaps are heated with rosin under certain reaction conditions they may increase the melting point of the rosin. Therefore a partial soap formation during the process may, so to speak, counteract the liquefaction procedure and the end melting point may be the differential result of the liquefying action of the modifying agent and of the solidifying action of a soap formation.

Possibly also non-volatile aggregates or polymers are formed.

In considering the nature of the modifications, it is to be noted that, while some small loss in weight may occur by volatilization (usually not more than about 15–20%), no appreciable fractional or destructive distillation takes place. With appropriate precautions to avoid distillation the process can usually be carried out without loss of more than 5% or 10%, such small loss as does occur usually comprising water, $CO_2$, etc., at least in major part. As a precaution, the temperature should be kept below the boiling or distillation point of the main reaction product, under the applied reaction conditions of the process. By this precaution, destructive distillation or cracking is positively avoided.

The modified rosin product is quite unique, since the rosin molecule retains almost as many carbon atoms as are present in the initial basic constituents of the rosin, the number of carbon atoms being reduced only by that number involved in the decarboxylation. Still further, the types of constituents of the modified rosin are very few in number, probably not more than two or three, and these constituents are characterized by boiling points all lying within a narrow and relatively high temperature range, as can be demonstrated by subsequent distillation of the modified products. The modified products, for practical purposes, are non-volatile when exposed to the air.

It is of importance in securing various of the foregoing characteristics that the reaction take place without any appreciable concurrent distillation. In addition, the absence of air and/or control of temperature are important in avoiding destructive distillation.

Whatever the exact nature of the chemical, colloidal and/or physical changes which are brought about, in general the treatment provided in accordance with the present invention reduces the acid value of the modified product and also softens or liquefies the material. These changes, together with others which usually take place, such as imparting drying characteristics to the rosin, and improving film forming properties of the modified products as compared with untreated rosin in the absence of other vehicle solids, for instance, make possible or practicable use of my modified rosin products for many purposes for which rosin in its natural state is not suited, or at least not well adaptable, and for which many known rosin derivatives are likewise not satisfactory.

By appropriate selection of modifying agent and treatment conditions, such as temperature, time, vacuum, etc., I am enabled to control various physical properties of the modified products, and notably the acid value, saponification value and physical consistency. In general, the most valuable modified products have, for instance, a saponification value not exceeding 120.

EXAMPLES

A series of comparative experiments were conducted under closely controlled conditions, so as to secure accurate comparative results, demonstrating the relative effectiveness of a number of different salts in the modification of rosin.

In all examples of this series, WW wood rosin (Newport Industries) was employed. In all examples a batch of 1000 gms. of rosin was treated with 50 gms. of the salt, the rosin and modifying agent being heated together in a three liter distilling flask under a pressure of 400 mms. Hg. Different temperatures were used in different examples, as is indicated in the table given herebelow.

For the sake of further comparison and analysis, a similar batch of 1000 gms. of WW wood rosin was heated as a "blank" experiment (see B in the table below), under the conditions above specified but without the presence of a modifying agent, this "blank" experiment being conducted at a temperature of 290° C., which temperature was also used in a number of the other examples. Moreover, a similar "blank" experiment was conducted at 320–330° C. (see C in the table below).

The initial untreated rosin had an acid value of about 169 and a melting point of about 81, as is shown in the table—see item A.

All temperatures are given in degrees centigrade.

*Table of comparative experiments*

| Ex. No. | Agent | Temp. | Acid value | Iodine value | Melting point | Consistency |
|---|---|---|---|---|---|---|
| 1 1 | Lead acetate ($3H_2O$). | 290 | 119.7 | 148.7 | 60 | Slightly plastic. |
| 1 2 | ---do-------- | 320–330 | 75.1 | 115.8 | ------ | Plastic. |
| 3 | Lead acetate (basic, anhydrous). | 290 | 107.2 | 148.9 | 56 | Slightly plastic. |
| 4 | ---do-------- | 320–330 | 63.4 | 112.3 | ------ | Plastic. |
| 5 | Aluminum acetate. | 290 | 93.0 | 167 | 60.5 | Slightly plastic. |
| A | (WW wood rosin without any treatment.) | ------ | 169 | 206.2 | 81 | Brittle solid. |
| B | (Heated without agent.) | 290 | 130.3 | 158.8 | 68 | Do. |
| C | ---do-------- | 320–330 | 97.8 | 129.1 | ------ | Plastic. |

1 Hydrated form.

The designations under the "Consistency" column may be further explained and amplified as follows:

Solid—consistency harder than that on which an impression can be made with the finger nail.
Slightly plastic—consistency such that an impression can be made with the finger nail, sometimes also displaying some degree of "cold flow."
Plastic—consistency such that the material may with ease be deformed with the finger and manifesting free "cold flow" characteristics.

In determining melting point, the mercury method was used. No melting point determinations were made on "plastic" or softer products because of the impracticability of securing accurate results.

In determining iodine values, the Wijs method was used.

The treatment temperature indicated in the foregoing table represents a fairly close average maintained throughout the five hour treatment period (usually within 10° C. plus or minus).

The foregoing table of examples illustrates appreciable reduction not only in acid value but also in melting point as compared with the corresponding blank, most of the products, in fact, having increased plasticity in comparison with the blank experiment.

The color of various of the products is frequently changed during the course of treatment, although it may be noted that with many of the acetates it is possible to secure products ranging from medium to light color, this being of advantage for a number of purposes, including use of the modified products in varnishes or other coating compositions.

Certain variations in procedure may be adopted.

For example, instead of using vacuum during the treatment period, other procedure may be adopted with a view to excluding air from the reaction. The form of the reaction vessel employed may be such that gases evolved from the reaction will serve to effectively exclude air, without applying vacuum. Furthermore, certain gases, such as $SO_2$, $CO_2$ or nitrogen can be either bubbled through the reaction mass or employed as a blanket on the surface of the batch undergoing treatment. Expedients of this type not only serve to exclude the air from the reaction but may also be utilized for their supplemental effect on the material being treated, this subject being more fully considered in my copending application Serial No. 386,371, filed April 1, 1941, of which the present application is a continuation. It is here further noted that certain features herein disclosed are also disclosed in my prior U. S. applications Serial No. 318,650, filed February 12, 1940 (now Patent No. 2,298,270), Serial No. 359,425 (now Patent No. 2,213,944) and Serial No. 143,786 (now Patent No. 2,189,772).

Moreover, as disclosed in the above mentioned copending applications, still other variations in process may be employed for a number of different purposes, but it is not thought necessary to discuss these fully herein, since reference may be made to the copending applications for that purpose. In passing, however, it is noted that additional treating agents, of a supplemental character, may also be present during the reaction, among which might be mentioned dissolution promoting agents of the type disclosed in my issued Patent No. 2,293,038. Various combinations of modifying agents may also be used for different purposes, including combinations of the modifying agents above disclosed, as well as combinations of the modifying agents herein disclosed with agents disclosed in other of my applications mentioned above as well as hereinafter.

It is further to be noted that in general increasing any one or all of the variables: namely, temperature, time of treatment and percentage of modifying agent, increases the extent of modification. It will be understood that the foregoing is a general rule normally applicable within the ranges of operation above indicated, although, as to at least some variables, there may be limits beyond which the general rule does not apply. For instance, excessive increase in temperature may substantially alter the character of the process. On the other hand, in instances where a soap forming metal is present in the modifying agent, excessive increase in percentage of modifying agent may not yield as soft a product as a lower percentage of the modifying agent.

In considering the starting material on which the process may be employed, it is first noted that the process brings about changes both of a colloidal and also of a chemical nature. It is important, however, to bear in mind that the process essentially involves a reaction with the rosin molecule, that is, with the type of molecules of which the basic constituents of natural rosin are composed. Therefore, while rosin itself, such as gum or wood rosins, represents perhaps the most important starting material to which the process is adaptable, it is noted that the process may be employed on rosin which has been pretreated in various ways, or on mixed or chemically condensed materials incorporating rosin, since the reaction will take place wherever the rosin molecule is present provided, of course, that the physical or chemical state or "environment" of the rosin molecule is not such as to prevent the reaction from taking place.

It may also be mentioned that there are other natural resins, such as copals, which act similarly to rosin by treatment in accordance with this invention. In fact, the reaction may be carried out on any of the natural resins containing high molecular resin acids. Therefore, wherever any such other natural resin behaves similarly to rosin, it is herein considered as an equivalent.

Copals are fossil gums which have to be "fused" before becoming soluble in organic solvents and miscible with fatty oil. When copals are used in the present process, they should be employed in the fused state.

The modified product of this invention may if desired, be subject to other treatment, depending upon the use for which it is intended. Thus, for example, the modified products may be vulcanized with sulphur. The modified resin products secured in accordance with the foregoing, may be vulcanized as such, or in solutions, such as varnish solutions, (in the latter case with sulphur chloride).

Further, they may be converted into emulsions and used for various purposes in that form.

In the event sulphur or other sulphur-like vulcanizing agents are used, vulcanization, for certain purposes, is desirably carried out at temperatures between about 120° C. and 200° C. For other purposes where vulcanization is to be effected at lower temperatures, for instance, at room temperature, sulphur chloride, or similarly acting vulcanizing agents, should be used. In instances where the vulcanization is carried out in a varnish solution, the sulphur chloride treatment is especially practical.

As is mentioned in my copending application Serial No. 386,371, filed April 1, 1941, the modified rosin products may be subject to still other supplemental treatments, such for instance as esterification, as by treating with glycerine or other polyhydric alcohols, such as glycols, pentaerythritol, mannitol, sorbitol, etc.

The vulcanized liquefied resin products made in accordance with the invention have valuable properties for a number of purposes including the making of protective coatings, some of these vulcanized products being useful as plasticizers for coating compositions and plastics.

It is noted that in copending applications filed concurrently herewith, certain other modifying agents are claimed in the treatment of rosin: See applications Serial Nos. 461,787; 461,790; 461,792 to 461,797 inclusive; and 461,800. Other rosin treatment is also disclosed in copending application 447,439 filed June 17, 1942.

I claim:

1. A process for making a modified and softened rosin product from hard and brittle rosin, which process comprises incorporation in the rosin of from 2% to 10% of a metal acetate selected from the class consisting of lead and aluminum acetates, and heating the mixture out of contact with the atmosphere between about 250° C. and 350° C., but not above the temperature at which appreciable destructive distillation occurs under the conditions of the treatment, the heating being continued for a time sufficient to lower the melting point and to reduce the acid value of the resin as compared with the melting point and acid value of the same rosin heated to the same temperature under the same treatment conditions but without modifying agent.

2. A process in accordance with claim 1 in which the heating is continued at least until the resultant mixture, when cooled, has cold flow consistency.

3. A process in accordance with claim 1 in which said acetate is a lead acetate.

4. A process in accordance with claim 1 in which said acetate is basic, anhydrous lead acetate.

5. A process in accordance with claim 1 in which said acetate is lead acetate containing water of crystallization.

6. A process in accordance with claim 1 in which said acetate is aluminum acetate.

7. A process in accordance with claim 1 in which the reaction mixture is heated at least to 270° C.

8. A process in accordance with claim 1 in which the heating is effected under vacuum.

LÁSZLÓ AUER.